United States Patent
Tanuma et al.

(10) Patent No.: US 6,791,650 B2
(45) Date of Patent: Sep. 14, 2004

(54) LIQUID CRYSTAL DISPLAY DEVICE OPERATING IN A VERTICALLY ALIGNED MODE OF LIQUID CRYSTAL MOLECULES

(75) Inventors: Seiji Tanuma, Kawasaki (JP); Yohei Nakanishi, Kawasaki (JP); Takatoshi Mayama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/282,772

(22) Filed: Mar. 31, 1999

(65) Prior Publication Data

US 2003/0142258 A1 Jul. 31, 2003

(30) Foreign Application Priority Data

Sep. 17, 1998 (JP) ............................................ 10-263578

(51) Int. Cl.$^7$ ...................... G02F 1/1343; G02F 1/1337
(52) U.S. Cl. ....................... 349/141; 349/130; 349/127; 349/181
(58) Field of Search ................................ 349/141, 130, 349/129, 123, 127, 134, 181

(56) References Cited

U.S. PATENT DOCUMENTS

| | | | | |
|---|---|---|---|---|
| 5,374,374 A | * | 12/1994 | Weber et al. ................ 252/299 |
| 5,495,355 A | * | 2/1996 | Konuma ....................... 359/78 |
| 5,907,380 A | * | 5/1999 | Lein ............................ 349/144 |
| 6,097,465 A | * | 8/2000 | Hiroki et al. ................ 349/141 |
| 6,144,434 A | * | 11/2000 | Kim et al. ................... 349/130 |
| 6,177,973 B1 | * | 1/2001 | Lee et al. .................... 349/123 |
| 6,180,026 B1 | * | 1/2001 | Rieger et al. .......... 252/299.63 |
| 6,181,402 B1 | * | 1/2001 | Shim et al. .................. 349/130 |
| 6,201,588 B1 | * | 3/2001 | Walton et al. ............... 349/123 |
| 6,222,599 B1 | * | 4/2001 | Yoshida et al. ............. 349/106 |
| 6,344,883 B2 | * | 2/2002 | Yamada et al. ............... 349/32 |

FOREIGN PATENT DOCUMENTS

JP  100-26767  1/1998

OTHER PUBLICATIONS

Yoshida et al, "Inclined Homeotropic Alignment by Irradiation of Unpolarized UV light"; Jpn. J.Appl.Phys., vol. 36 (1997), pp. 428–431.*
T. Hashimoto et al.; "41.4: TN–LCD with Quartered Subpixels Using Polarized UV–Light–Irradiated Polymer Orientation Films"; SID 95 Digest, pp. 877–880; 1995.
T. Yamamoto et al.; "Liquid–Crystal Alignment by Siantwise Irradiation of Non–Polaried UV Light on a Polyimide Layer"; SID 96 Digest, pp. 642–645; 1996.
H. Yoshida et al.; "Inclinded Homeotropic Alignment by Irradiation of Upolarized UV Light"; Jpn. J. Appl. Phys., vol. 36, pp. 428–431, Pat 2, No. 4A; Apr. 1, 1997.
H. Yoshida et al.; "Inclined Homeotropic Alignment by Irradiation of Unpolarized UV Light"; 23rd Liquid Crystal Conference, Lecture No. 2AB01; 1997.
Nematic Homogeneour Alignment with Pre–tilt Angle by Linearly Polarized Deep UV Exposed Polyimide Masaki Hasegawa, Yoichi Taira; IBM Research, Tokyo Research Laboratory.

* cited by examiner

Primary Examiner—Tarifur R. Chowdhury
Assistant Examiner—Mike Qi
(74) Attorney, Agent, or Firm—Greer, Burns & Crain, Ltd.

(57) ABSTRACT

A vertically aligned liquid crystal display device includes a site in a liquid crystal layer in which liquid crystal molecules are tilted in a predetermined direction in a non-activated state of the liquid crystal display device.

2 Claims, 6 Drawing Sheets

LIQUID CRYSTAL DISPLAY DEVICE OPERATING IN A VERTICALLY ALIGNED MODE OF LIQUID CRYSTAL MOLECULES

BACKGROUND OF THE INVENTION

The present invention generally relates to liquid crystal display devices and more particularly to a high-contrast liquid crystal display device characterized by a fast response speed and a low electric power consumption.

FIG. 1 shows the construction of a conventional liquid crystal display device of the so-called TN-mode.

Referring to FIG. 1, the conventional liquid crystal display device includes a glass substrate 2a carrying thereon a number of active devices including pixel electrodes 6 and cooperating bus lines 5, wherein the glass substrate 2a faces a glass substrate 2b carrying thereon an opposing electrode 3, with a liquid crystal layer 1 interposed between the glass substrate 2a and the glass substrate 2b. It should be noted that the glass substrate 2a further carries a molecular alignment film 4 so as to cover the foregoing active devices, while the glass substrate 2b carries another molecular alignment film 5 so as to cover the opposing electrode 3.

In the conventional structure of FIG. 1, a liquid crystal called TN (twist-nematic) type is used commonly for the liquid crystal layer 1. In such a conventional, TN-mode liquid crystal display device using a TN-type liquid crystal, the liquid crystal molecules are aligned generally parallel to the plane of the substrates in the non-activated state thereof in which no drive voltage is applied to the liquid crystal layer. In the non-activated state, the liquid crystal molecules are further twisted between the substrate 2a and the substrate 2b with a twist angle of 90°. When a drive voltage is applied to the liquid crystal layer 1, on the other hand, the liquid crystal molecules are aligned generally perpendicular to the plane of the substrates 2a and 2b.

Such a TN-mode liquid crystal display device is used commonly in various information processing apparatuses. Further, low-cost fabrication process of such a TN-mode liquid crystal display device is well established by now.

On the other hand, a TN-mode liquid crystal display device generally has a drawback in that the contrast ratio of represented images changes substantially depending on the viewing angle. While there are various attempts to improve the viewing angle characteristic of TN-mode liquid crystal display devices, it has been still difficult to realize a viewing characteristic comparable to that of a CRT display device.

On the other hand, there is another type of liquid crystal display device in which the liquid crystal molecules are aligned generally perpendicularly to the plane of the glass substrate. In such vertically aligned liquid crystal display devices, the liquid crystal molecules are aligned generally perpendicular to the plane of the glass substrates in the non-activated state.

FIGS. 2A and 2B show the construction of one type of such a vertically aligned liquid crystal display device.

Referring to FIG. 2A showing a pixel of such a vertically aligned liquid crystal display device in the non-activated state thereof, the liquid crystal display device includes a first glass substrate 10 carrying thereon a pair of electrodes 11a and 11b and a second glass substrate 12 facing the first glass substrate 10, and a liquid crystal layer 14 is sandwiched between the glass substrate 10 and the glass substrate 12. In the non-activated state of the liquid crystal display device, it should be noted that no drive voltage is applied across the electrodes 11a and 11b.

The liquid crystal layer 14 includes liquid crystal molecules 16, wherein the liquid crystal molecules 16 are aligned generally perpendicularly to the plane of the substrate 10 in the non-activated state of the liquid crystal display device represented in FIG. 2A. It should be noted that the surface of the substrate 10 on which the electrodes 11a and 11b are provided is covered by a molecular alignment film not illustrated. Similarly, the surface of the substrate 12 facing the liquid crystal layer 14 is covered by a molecular alignment film not illustrated. Further, a pair of polarizers not illustrated are disposed at respective outersides of the glass substrate 10 and the glass substrate 12.

In the activated state represented in FIG. 2B in which a drive voltage is applied across the electrodes 11a and 11b, on the other hand, the liquid crystal molecules 16 are aligned in the direction of the electric filed inside the liquid crystal layer 14. Thereby, the pixel represented in FIG. 2B is divided into a first region at a first side of a line A–A' and a second region at a second, opposite side of the line A–A', wherein it can be seen that the liquid crystal molecules 16 are tilted in respective, mutually opposite directions in the first region and in the second region. As a result of such a subdivision of the pixel, the liquid crystal display device provides an excellent viewing angle characteristic.

On the other hand, the vertically aligned liquid crystal display device of FIG. 2 has a drawback in that it requires a drive voltage of at least 5 V. In order to reduce the power consumption of the liquid crystal display device, it is desired to reduce the drive voltage.

In a liquid crystal display device, the drive voltage is generally reduced by increasing the retardation value $\Delta n \cdot d$, wherein $\Delta n$ represents the birefringence and d represents the cell thickness. On the other hand, there has been little information about the optimum value for the birefringence $\Delta n$ or for the cell thickness d in this type of the vertically aligned liquid crystal display devices.

Further, this type of vertically aligned liquid crystal display devices have conventionally suffered from the problem of poor response speed. This drawback becomes particularly conspicuous when performing a motion picture representation.

SUMMARY OF THE INVENTION

Accordingly, it is a general object of the present invention to provide a novel and useful liquid crystal display device wherein the foregoing problems are eliminated.

Another object of the present invention is to provide a liquid crystal display device, comprising:

a first substrate;

a second substrate facing said first substrate;

a liquid crystal layer interposed between said first and second substrates; and a group of electrodes disposed on said first substrate so as to create an electric field in said liquid crystal layer generally parallel to said first substrate in an activated state in which a drive voltage is applied to said group of electrodes;

said liquid crystal molecules aligning generally perpendicularly to a plane of said first substrate in a non-activated state in which said drive voltage is not applied to said group of electrodes, said liquid crystal molecules aligning generally parallel to said plane of said first substrate in said activated state;

said liquid crystal molecules having a pre-tilt angle of less than 90° in at least one of a part of said liquid crystal layer corresponding to a pixel and said electrode on said first substrate.

According to the present invention, the response speed of the liquid crystal display device is improved by locally setting the pre-tilt angle of the liquid crystal molecules to be less than 90°. Thereby, such pre-tilted liquid crystal molecules act as a nuclei when a drive electric field is applied to the liquid crystal layer, and the tilting of the liquid crystal molecules propagates rapidly throughout the liquid crystal layer, starting from such a site of the pre-tilted molecules. Associated with this, the drive voltage of the liquid crystal display device is reduced, and hence the electric power consumption.

Other objects and further features of the present invention will become apparent from the following detailed description when read in conjunction with the attached drawings.

DETAILED DESCRIPTION OF THE PREFERRED EMBODIMENTS

[PRINCIPLE]

Figure 1:
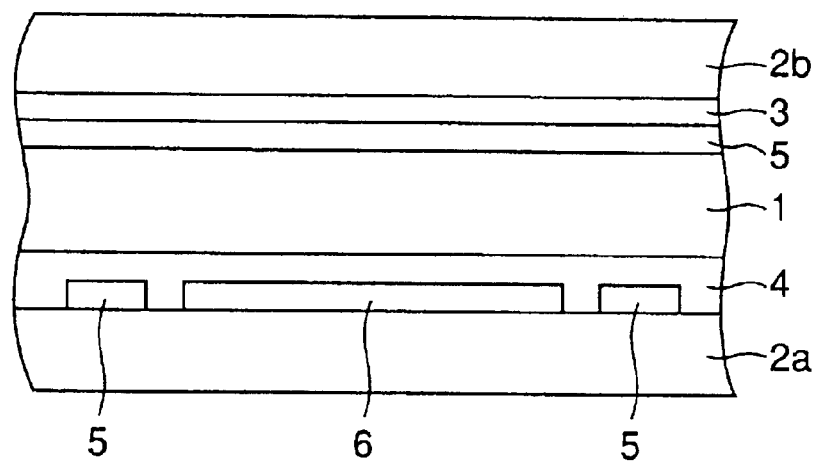
FIG. 1 is a diagram showing the construction of a conventional TN-mode liquid crystal display device.

First, the principle of the present invention will be explained with reference to FIG. 3 and FIG. 4, wherein those parts corresponding to the parts described previously are designated by the same reference numerals and the description thereof will be omitted.

Figure 3:
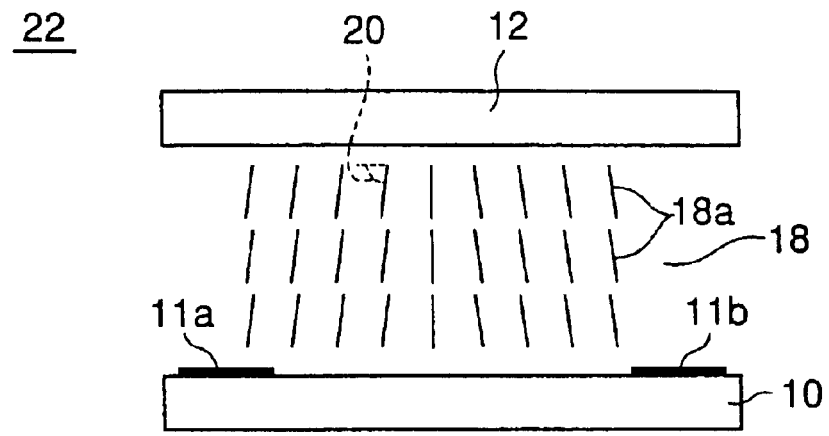
FIG. 3 is a diagram showing the principle of the liquid crystal display panel of the present invention.

Referring to FIG. 3, the electrodes 11a and 11b are formed on the first substrate 10, and the first substrate 10 and the second substrate 12 sandwich therebetween a liquid crystal layer 18. As represented in FIG. 3, the liquid crystal layer 18 contains liquid crystal molecules 18a, wherein each of the liquid crystal molecules 18a is provided with a pre-tilt angle 20 with respect to the substrate 12 and hence the substrate 10.

According to a first aspect of the present invention, the liquid crystal molecules are easily tilted in the pre-tilt direction when the drive voltage is applied across the electrodes 11a and 11b and the liquid crystal display device is activated. Associated therewith, the response speed of representation of the liquid crystal display device is improved. Further, the drive voltage is reduced substantially and hence the electric power consumption.

Figure 4:
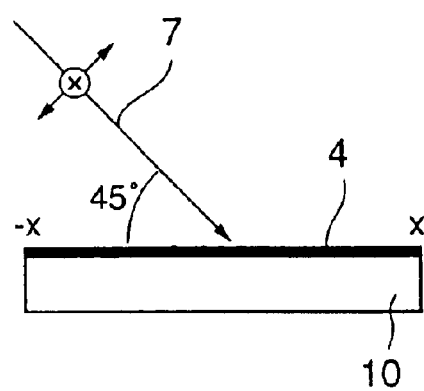
FIG. 4 is another diagram showing the principle of the liquid crystal display panel of the present invention.

FIG. 4 shows irradiation of the molecular alignment film 4 covering the surface of the glass substrate 10 with a ultraviolet beam 7 according to a second aspect of the present invention.

As a result of exposure of the molecular alignment film to an ultraviolet radiation, the desired pre-tilt angle is provided to the liquid crystal molecules. Further, such an exposure of the molecular alignment film to the ultraviolet radiation 7 causes a decrease in the specific resistance of the liquid crystal layer 18, and the electric charges on the substrate surface are quickly dissipated. Thereby, the liquid crystal display device becomes substantially free from sticking of images and the quality of image representation is improved.

Further, there is a third aspect of the present invention in which the desired decrease of the drive voltage and electric power consumption is achieved by choosing the liquid crystal constituting the liquid crystal layer 18 or by setting the thickness d of the liquid crystal layer 18 such that the retardation value $\Delta n \cdot d$ is increased as much as possible.

[FIRST EMBODIMENT]

Figure 5:
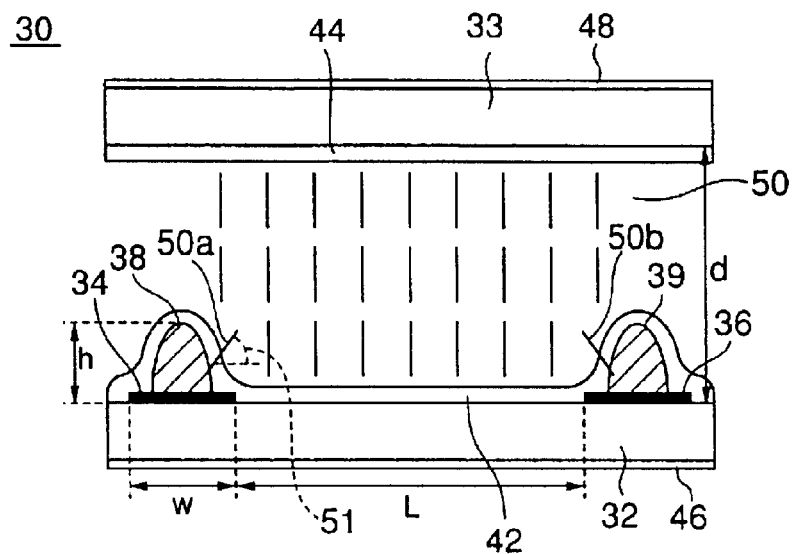
FIG. 5 is a diagram showing the construction of a liquid crystal display device according to a first embodiment of the present invention.

FIG. 5 shows a liquid crystal display device 30 according to a first embodiment of the present invention in a cross-sectional view.

Referring to FIG. 5, the liquid crystal display device 30 includes a first glass substrate 32 carrying thereon electrodes 34 and 36, wherein it should be noted that the electrodes 34 and 36 carry thereon organic projections 38 and 39 respectively. Further, the first glass substrate 32 is covered by a molecular alignment film 42 such that the molecular alignment film 42 covers the electrodes 34 and 36 and further the projections 38 and 39. Further, another molecular alignment film 44 covers the surface of a second glass substrate 33. The first glass substrate 32 and the second glass substrate 33 are disposed such that a liquid crystal layer 50 is sandwiched therebetween. Thereby, the molecular alignment films 42 and 44 restrict the direction of the liquid crystal molecules in the liquid crystal layer 50 such that the liquid crystal molecules are aligned generally perpendicularly to the plane of the substrate 32 or 33 in the non-activated state of the liquid crystal display device 30. In other words, the molecular alignment films 42 and 44 are vertically aligning molecular alignment films.

The liquid crystal display device 30 of FIG. 5 is fabricated according to the process as follows.

First, the electrodes 34 and 36 are formed on the first glass substrate 31 by a patterning process of a conductor layer such that each of the electrodes 34 and 36 has a width W of 5 μm and such that the electrodes 34 and 36 are separated from each other by a mutual separation L of about 12 μm.

Next, the projections 38 and 39 are formed respectively on the electrodes 34 and 36 in the form of a resist pattern having a height h of about 1.5 μm. After applying a thermal curing process to the resist pattern thus formed at the temperature of about 120° C. for about 30 minutes, each of the projections 38 and 39 undergoes a reflowing, and the resist projections 38 and 39 are transformed to have a bell-shaped form.

Next, the vertically aligning molecular alignment film 42 is formed on the glass substrate 32 so as to cover-the electrodes 34 and 36. Similarly, the vertically aligning molecular alignment film 44 is formed on the inner surface of the glass substrate 33. The substrates 32 and 33 are then assembled such that the molecular alignment films 42 and 44 face with each other with a separation d of about 9 μm.

Further, polarizers 46 and 48 are disposed on respective outer surfaces of the first glass substrate 32 and the second glass substrate 33 such that the optical absorption axis of the polarizer 46 cross perpendicularly the optical absorption axis of th polarizer 48. Further, the liquid crystal layer 50 is confined into the gap thus formed between the substrate 32 and the substrate 33.

As represented in FIG. 5, the liquid crystal molecules in the liquid crystal layer 50 are aligned vertically to the plane of the substrate 32 or 33 in the non-activated state of the liquid crystal display device 30, except for those liquid crystal molecules adjacent to the foregoing bell-shaped projections 38 and 39.

In view of the nature of the vertically aligning molecular alignment film 42, it should be noted that the liquid crystal molecules maintain a generally vertical relationship with respect to the molecular alignment film 42, including the liquid crystal molecules 50a and 50b that are located adjacent to the projection 38 or the projection 39. Thereby, the liquid crystal molecule 50a or 50b form an oblique, pre-tilt angle 51 with respect to the substrate 32, wherein it should be noted that the direction of the pre-tilt angle 51 is identical with the general direction of tilting of the liquid crystal molecules when a drive voltage is applied across the electrodes 34 and 36. Thus, when a drive voltage is applied across the electrodes 34 and 36, the liquid crystal molecules in the liquid crystal layer 50 is influenced by the pre-tilt direction of the liquid crystal molecules 50a and 50b and undergo a tilting in the same direction as the pre-tilt direction of the liquid crystal molecules 50a and 50b. Such a tilting of the liquid crystal molecules propagates to other liquid crystal molecules in the liquid crystal layer 50 rapidly.

Thus, the liquid crystal molecules 50a and 50b determine the tilting direction of the liquid crystal molecules in the liquid crystal layer 50 when a drive voltage is applied to the electrodes 34 and 36. Thereby, the time needed for the entire liquid crystal molecules in the liquid crystal layer 50 to undergo the tilting is substantially reduced.

Figure 2A:
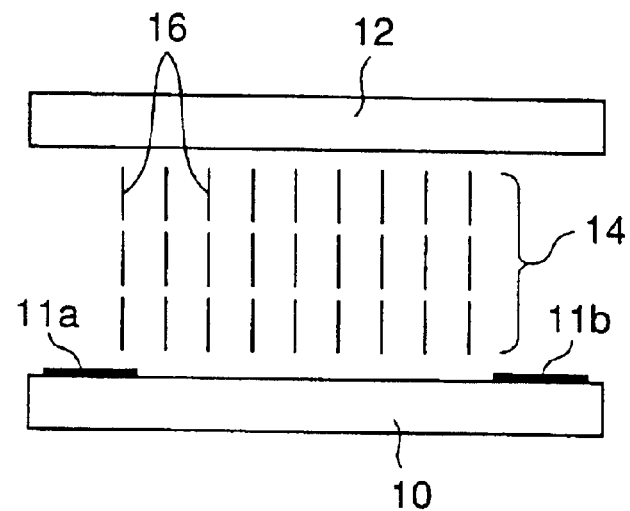
FIGS. 2A and 2B are diagrams showing the construction of a conventional vertically aligned liquid crystal display device respectively in a non-activated state and in an activated state thereof.
Figure 2B:
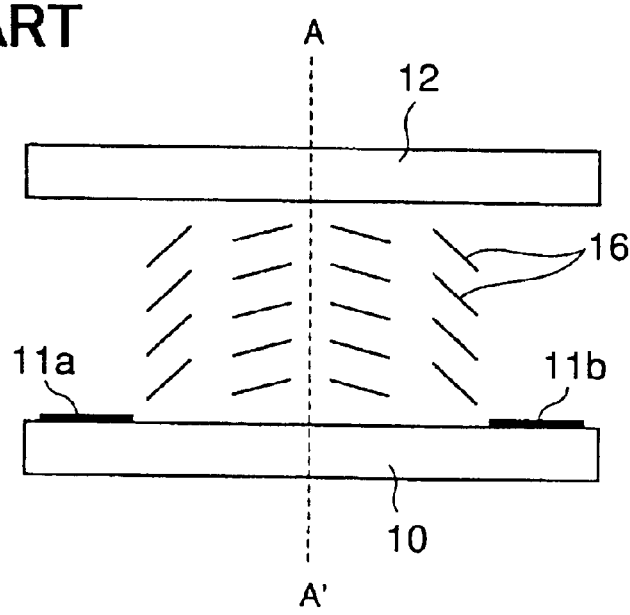

In the event the pre-tilted liquid crystal molecules 50a or 50b were not present, on the other hand, it would take a longer time until the entire liquid crystal molecules undergo tilting as represented in the state of FIG. 2A because of the lack of the factor that determines the initial direction of the tilting. Associated with this, the drive voltage necessary for driving the liquid crystal display device 30 would increase. Thereby, the electric power necessary for driving the liquid crystal display device 30 would increase also.

As noted above, the pre-tilting of the liquid crystal molecules 50a and 50b effectively reduces the time and magnitude of the electric field necessary for causing the tilting of the entire liquid crystal molecules in the liquid crystal layer 50.

Table 1 below compares the performance of the liquid crystal display device 30 with the performance of a conventional vertically aligned liquid crystal display device in which no such a projection is provided, wherein it should be noted that Table 1 compares the saturation voltage and response time needed for the liquid crystal display device to reach a predetermined transmittance.

TABLE 1

|  | saturation voltage | response time [ms] on/off |
|---|---|---|
| conventional | 5.0 V | 25/38 |
| 1st embodiment | 4.3 V | 23/37 |

Table 1 clearly indicates the decrease of the saturation voltage in the present embodiment in which the projections 38 and 39 are formed over the conventional device. This means that the voltage needed for driving the liquid crystal display device 30 is reduced over the conventional device. Further, the response time is improved over the conventional device. It should be noted that a saturation voltage is a voltage needed for a liquid crystal display device to achieve a predetermined transmittance.

[SECOND EMBODIMENT]

Next, a liquid crystal display device 31 according to a second embodiment of the present invention will be described with reference to FIG. 6, wherein those parts corresponding to the parts described previously are designated by the same reference numerals and the description thereof will be omitted.

Figure 6:
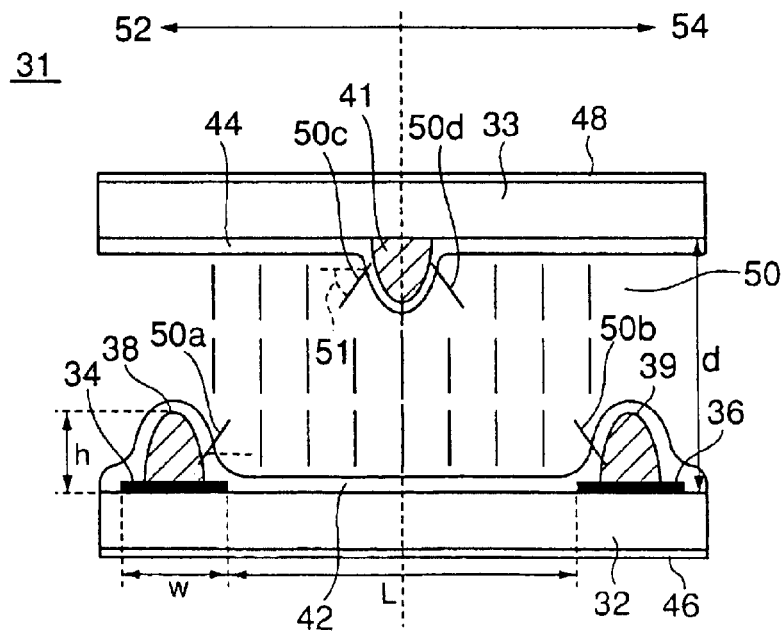
FIG. 6 is a diagram showing the construction of a liquid crystal display device according to a second embodiment of the present invention.

Referring to FIG. 6, it can be seen that the liquid crystal display device 31 has a construction similar to that of the liquid crystal display device 30 of the previous embodiment, except that there is formed a projection 41 also on the second glass substrate 33.

The projection 41 may be formed as a resist pattern prior to the step of forming the molecular alignment film 44 on the substrate 33 such that the projection 41 faces the opposing glass substrate 32. Typically, the resist pattern forming the projection 41 is formed with a height h of about 1.5 $\mu$m, similarly to the resist patterns forming the projections 38 and 39. After formation of the resist pattern 41, a thermal curing process is applied before providing the molecular alignment film 44. Thereby, the resist pattern 41 undergoes a reflowing to form a bell-shaped projection similarly to the projections 38 and 39. Thereafter, the molecular alignment film 44 is provided on the glass substrate 33 so as to cover the projection 41.

By providing the projection 41, the liquid crystal molecules 50c and 50d adjacent to the projection 41 are provided with the pre-tilt angle 51, and the pixel region is divided into a first region 52 located at a first side of the projection 41 and a second region 54 located at a second side of the projection 41. In the first region 52, the direction of tilting of the liquid crystal molecule 50c is generally the same with the direction of tilting of the liquid crystal molecule 50a. Similarly, the direction of tilting of the liquid crystal molecule 50d is generally the same with the direction of tilting of the liquid crystal molecule 50b in the second region 54. Thus, the tilting of the liquid crystal molecules in the liquid crystal layer 50 in the activated state of the liquid crystal display device 31 is substantially facilitated and a further reduction of the drive voltage and a further increase of the response speed are achieved.

Table 2 below represents the performance of the liquid crystal display device 31 of the present embodiment in comparison with the performance of the conventional vertically aligned liquid crystal display device noted in Table 1.

TABLE 2

|  | saturation voltage | response time [ms] on/off |
|---|---|---|
| conventional | 5.0 V | 25/38 |
| 2nd embodiment | 3.8 V | 20/36 |

As is expected, the liquid crystal display device 31 of the present embodiment shows a reduced saturation voltage and increased response speed over the conventional vertically aligned liquid crystal display device having no such projections. The result of TABLE 2 further indicates that the addition of the projection 41 in addition to the projections 38 and 39 further improves the performance of the liquid crystal display device.

[THIRD EMBODIMENT]

Figure 7:
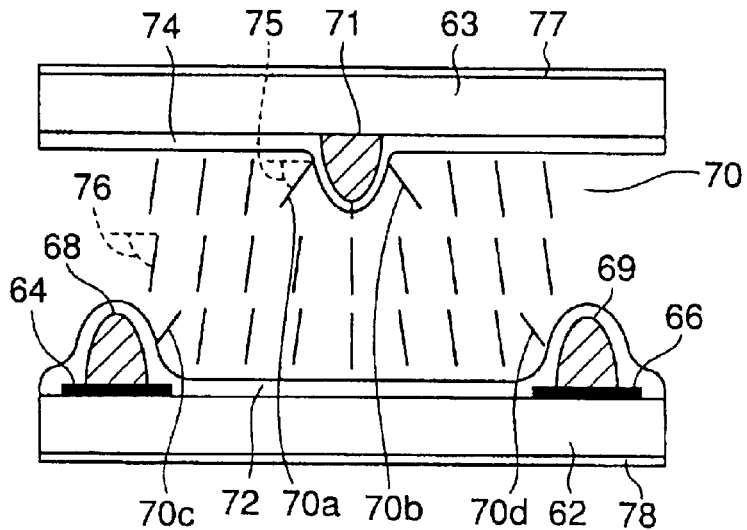
FIG. 7 is a diagram showing the construction of a liquid crystal display device according to a third embodiment of the present invention.

FIG. 7 shows the construction of a liquid crystal display device 60 according to a third embodiment of the present invention.

Referring to FIG. 7, the liquid crystal display device 60 includes a first glass substrate 62 carrying thereon electrodes 64 and 66, wherein the electrodes 64 and 66 carry thereon projections 68 and 69 respectively. Further, the first glass substrate 62 is covered by a molecular alignment film 72 wherein the molecular alignment film 72 is formed so as to cover the electrodes 64 and 66.

Further, the liquid crystal display devise 60 includes a second glass substrate 63 carrying thereon a projection 71, wherein the second glass substrate 63 including the projection 71 is covered by a molecular alignment film 74.

The first and second substrates 62 and 63 are disposed so as to sandwich a liquid crystal layer 70 therebetween, and polarizers 78 and 77 are disposed at respective outer-sides of the substrates 62 and 63.

The liquid crystal display device 60 of FIG. 7 is fabricated as follows.

First, the electrodes 64 and 66 are formed on the first substrate 62 by a patterning process of a conductive layer, and the projections 68 and 69 are formed respectively on the electrodes 64 and 66 in the form of a resist pattern. Further, the projection 71 is formed on the substrate 63 also in the form of a resist pattern.

The resist patterns thus formed for the projections 68 and 69 or the projection 71 are then subjected to a thermal curing process together with the substrate 62 or 63, wherein the resist patterns undergo a reflowing during such a thermal curing process, and the projections 68 and 69 and the projection 71 are formed to have a bell-shaped form.

After the formation of the projections 68 and 69 as mentioned above, the surface of the substrate 62 carrying the projections 68 and 69 is covered by the molecular alignment film 72. Similarly, the surface of the substrate 63 carrying the projection 71 is covered by the molecular alignment film 74. The substrates 62 and 63 thus prepared are assembled to form a liquid crystal cell, and the liquid crystal layer 70 is confined between the space formed between the substrates 62 and 63.

In the present embodiment, the liquid crystal display device thus fabricated is subjected to an ultraviolet exposure process similar to that of FIG. 4, wherein the molecular alignment films 72 and 74 are exposed to a ultraviolet radiation before the substrates 62 and 63 are assembled.

More in detail, the ultraviolet exposure process is conducted twice, first from a first direction and next from a second, opposite direction while protecting the right-side part of the projection 71 of the liquid crystal cell by a mask (not shown) during the first exposure process and while protecting the left-side part of the projection 71 of the liquid crystal cell by another mask (not shown) during the second exposure process.

By applying a ultraviolet radiation to the molecular alignment films 72 and 74 as noted above, the liquid crystal molecules in the liquid crystal layer 70 are tilted with a tilt angle 76, wherein the foregoing exposure process is optimized such that the liquid crystal molecules are tilted in the same tilting direction of the liquid crystal molecule 70a or 70c adjacent to the projection 68 or 71 in the left-side part of the projection 71 and such that the liquid crystal molecules are tilted in the same tilting direction of the liquid crystal molecule 70b or 70d adjacent to the projections 69 or 71 in the right-side part of the projection 71. Thereby, the liquid crystal molecules in the liquid crystal layer 70 at the left-side part of the projection 71 generally have the same tilt angle 76 in a first tilting direction, while the liquid crystal molecules at the right-side part of the projection 71 generally have the same tilt angle in the opposite tilting direction.

By conducting the ultraviolet exposure process with a dose of about 1.5 J/cm$^2$ with the angle of the ultraviolet beam set to 45° as represented in FIG. 4, an angle of about 89° is realized for the tilt angle 76 of the liquid crystal molecules. As the liquid crystal molecules are thus tilted generally uniformly in the respective tilting directions throughout the right-side part or left-side part of the projection 71 in the liquid crystal layer 70, the tendency of the liquid crystal molecules to cause a tilting upon application of a driving electric field to the liquid crystal layer 70 is enhanced further.

Table 3 below represents the saturation voltage and response time for the liquid crystal display device 60 of the present embodiment.

TABLE 3

|  | saturation voltage | response time [ms] on/off |
|---|---|---|
| conventional | 5.0 V | 25/38 |
| 3rd embodiment | 4.1 V | 22/37 |

As can be seen in Table 3, the liquid crystal display device 60 of the present embodiment has the saturation voltage and response time improved substantially over the conventional vertically aligned liquid crystal display device.

In the present embodiment, there is a further advantageous feature, associated with the ultraviolet exposure process, in that such an ultraviolet radiation reduces the resistance of the liquid crystal layer 70. More specifically, such a ultraviolet radiation effectively eliminates the electric charges accumulated between the liquid crystal layer 70 and the molecular alignment film 72 or 74 and the quality of image representation is improved.

[FOURTH EMBODIMENT]

Next, a liquid crystal display device 80 according to a fourth embodiment of the present invention will be described with reference to FIG. 8.

Figure 8:
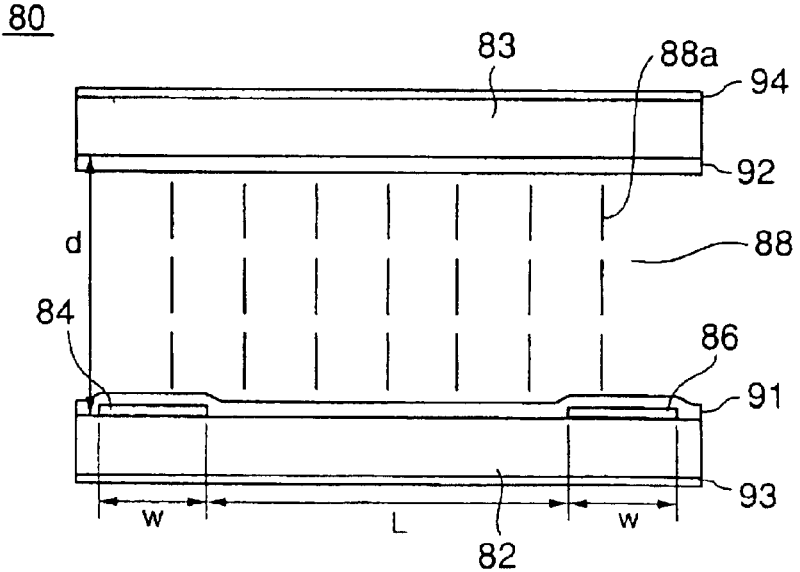
FIG. 8 is a diagram showing the construction of a liquid crystal display device according to a fourth embodiment of the present invention.

Referring to FIG. 8, the liquid crystal display device 80 includes a first glass substrate 82 carrying thereon electrodes 84 and 86, wherein the surface of the glass substrate 82 carrying the electrodes 84 and 86 is covered by a molecular alignment film 91 including the electrodes 84 and 86. Further, the liquid crystal display device 80 includes a second glass substrate 83 covered by another molecular alignment film 92.

The glass substrate 82 and the glass substrate 83 are assembled such that the surface of the substrate 82 carrying the molecular alignment film 91 faces the surface of the substrate 83 carrying the molecular alignment film 92, and a liquid crystal layer 88 is confined in the space formed between the glass substrates 82 and 83 thus assembled. Further, there are provided polarizers 93 and 94 at respective outer-sides of the glass substrates 82 and 83.

In the present embodiment, the formation of projections used in the previous embodiments is eliminated by selecting the material of the liquid crystal layer 88. Further, the present embodiment eliminates the process of ultraviolet radiation. More specifically, the liquid crystal display device 80 of the present embodiment achieves the desired decrease of driving voltage and power consumption by optimizing the material of the liquid crystal layer 88 and the cell structure of the device 80 such that the retardation value Δn·d is maximized.

The simplest answer to increase the retardation value Δn·d would be to increase the cell thickness d as large as possible. However, such an increase in the cell thickness d tends to invite a deterioration in the response speed. In order to increase the retardation value Δn·d while simultaneously suppressing the increase of the cell thickness d, therefore, it is necessary to choose a liquid crystal material having a large birefringence Δn for the liquid crystal layer 88.

The requirement for the birefringence Δn of the liquid crystal layer 88 is as follows.

In view of the maximum allowable value of the cell thickness d, which is determined from the desired response speed of the liquid crystal display device 80, the liquid crystal layer 88 is required to have a birefringence Δn of larger than about 0.15. On the other hand, in view of the practical lower limit value of the cell thickness d of about 3 μm, which lower limit value being determined by the fabrication technology used for mass producing the liquid crystal display device 80, the liquid crystal layer 88 is required to have a birefringence Δn of smaller than 0.25.

Thus, the liquid crystal material forming the liquid crystal layer 88 should have a birefringence Δn satisfying the relationship (1)

$$0.15 < \Delta n \cdot d < 0.25 \tag{1}$$

The relationship (1) is satisfied by using a liquid crystal containing a tolan-family component. Generally, a tolan-family liquid crystal has a low resistance and is advantageous for dissipating static electric charges. Thereby, a high-quality image representation free from sticking of the images is achieved easily.

In the liquid crystal display device 80 of the present embodiment, a liquid crystal having a birefringence Δn of 0.202 (Δn=0.202) is used in combination with a cell thickness d of 3.5 μm (d=3.5 μm), wherein the liquid crystal has a dielectric anisotropy Δε of 5.8 (Δε=5.8). In the liquid crystal device 80, each of the electrodes 84 and 86 has a width W of 5 μm, wherein the electrodes 84 and 86 are separated from each other by a distance L of 12 μm. As noted already, the liquid crystal display device 80 includes no projections. Further, there is no exposure process to ultraviolet radiation in the fabrication process of the liquid crystal display device 80.

Table 4 below compares the performance of the liquid crystal display device 80 thus formed with the conventional vertically aligned liquid crystal display device.

TABLE 4

|  | saturation voltage | response time [ms] on/off |
|---|---|---|
| conventional | 5.0 V | 25/38 |
| 4th embodiment | 5.1 V | 15/20 |

Referring to Table 4, it can be seen that the response time is reduced substantially over any of the conventional device or the device of first through third embodiments, wherein the result of Table 4 indicates that the use of the liquid crystal having a large birefringence larger than in any of the foregoing first through third embodiments improves the voltage response characteristic with regard to the tilting of the liquid crystal molecules.

[FIFTH EMBODIMENT]

Figure 9:
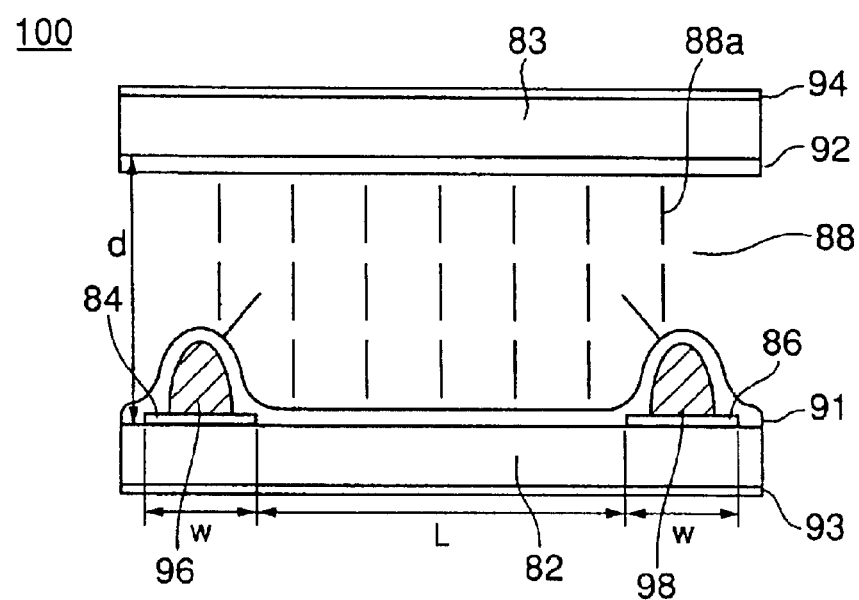
FIG. 9 is a diagram showing the construction of a liquid crystal display device according to a fifth embodiment of the present invention.

FIG. 9 shows the construction of a liquid crystal display device 100 according to a fifth embodiment of the present invention, wherein the liquid crystal display device 100 has a construction similar to that of the liquid crystal display device 80 of the previous embodiment except that projections 96 and 98 are respectively provided on the electrodes 84 and 86. In FIG. 9, those parts corresponding to the parts described previously are designated by the same reference numerals and the description thereof will be omitted.

Table 5 below represents the saturation voltage and response time for the liquid crystal display device 100 of the present embodiment in comparison with the conventional vertically aligned liquid crystal display device.

TABLE 5

|  | saturation voltage | response time [ms] on/off |
|---|---|---|
| conventional | 5.0 V | 25/38 |
| 5th embodiment | 4.3 V | 9/15 |

Referring to Table 5, it can be seen that both the saturation voltage and response time are improved substantially over the conventional device. Particularly, the improvement of response time is remarkable. The result of Table 5 indicates that the combination of the construction of the embodiment of FIG. 8 with the feature of the projections in the first embodiment is highly effective for reducing the electric power consumption of the liquid crystal display device.

Further, the present invention is not limited to the embodiments described heretofore, but various variations and modifications may be made without departing from the scope of the present invention.

What is claimed is:

1. A liquid crystal display device, comprising:

a first substrate;

a second substrate facing said first substrate;

a liquid crystal layer interposed between said first and second substrates; and a group of electrodes disposed on said first substrate so as to create an electric field in said liquid crystal layer generally parallel to said first substrate in an activated state in which a drive voltage is applied to said group of electrodes, said liquid crystal molecules aligning generally perpendicularly to a plane of said first substrate in a nonactivated state in which said drive voltage is not applied to said group of electrodes, said liquid crystal molecules aligning generally parallel to said plane of said first substrate in said activated state, said liquid crystal molecules having a pre-tilt angle of less than 90° in at least one of a part of said liquid crystal layer corresponding to a pixel and said electrodes on said first substrate, wherein said electrodes include a first electrode of an opaque metal provided on a surface of said first substrate facing said second substrate and a second electrode of an opaque metal provided on said surface with a separation from said first electrode, the separation creating a space which is part of the pixel, said first and second electrodes being provided outside a display area in which transmission of an optical beam is turned on and off, and wherein said liquid crystal display device further includes a first projection provided on said first electrode and a second projection provided on said second electrode, said first and second projections inducing said pre-tilt angle in said liquid crystal molecules located adjacent to said first and second projections.

2. A liquid crystal display device, comprising:

a first substrate;

a second substrate facing said first substrate;

a liquid crystal layer interposed between said first and second substrates; and a group of electrodes disposed on said first substrate so as to create an electric field in said liquid crystal layer generally parallel to said first substrate in an activated state in which a drive voltage is applied to said group of electrodes; and a molecular alignment film provided on said first substrate so as to cover said electrodes, said liquid crystal molecules aligning generally perpendicularly to a plane of said first substrate in a nonactivated state in which said drive voltage is not applied to said group of electrodes, said liquid crystal molecules aligning generally parallel to said plane of said first substrate in said activated state, said liquid crystal molecules having a pre-tilt angle of less than 90° in at least one of a part of said liquid crystal layer corresponding to a pixel and said electrode on said first substrate, wherein said electrodes include a first electrode of an opaque metal provided on a surface of said first substrate facing said second substrate and a second electrode of an opaque metal provided on said surface with a separation from said first electrode, the separation creating a space which is part of the pixel, said first and second electrodes being provided outside a display area in which transmission of an optical beam is turned on and off, and wherein said liquid crystal display device further includes a first region in said molecular alignment film in correspondence to said first electrode and a second region in said molecular alignment film in correspondence to said second electrode, said first and second regions being formed by ultraviolet irradiation and inducing said pre-tilt angle in said liquid crystal molecules located adjacent to said first and second regions.

* * * * *